United States Patent [19]

Wright

[11] 4,396,963

[45] Aug. 2, 1983

[54] ACCESS DOOR LATCH AND INTERLOCK MECHANISM

[75] Inventor: Harold T. Wright, San Carlos, Calif.

[73] Assignee: Disctron, Milpitas, Calif.

[21] Appl. No.: 253,085

[22] Filed: Mar. 31, 1981

[51] Int. Cl.³ .................... G11B 17/02; G11B 21/12; G11B 5/54

[52] U.S. Cl. .................................. 360/97; 360/105

[58] Field of Search .................................. 360/97-99, 360/105

[56] References Cited

U.S. PATENT DOCUMENTS 3,797,033  3/1974  Prieur .................................. 360/105
3,973,272  8/1976  Morgan et al. .................... 360/105

Primary Examiner—Robert S. Tupper
Attorney, Agent, or Firm—Spensley, Horn, Jubas & Lubitz

[57] ABSTRACT

A latch interlock mechanism for an access door through which a magnetic disc cartridge is inserted into a disc-drive assembly. The interlock prevents the access door from being opened while a magnetic head is being loaded or is loaded onto the disc. A pivot latch cooperating with the access door is coupled to a rigid rod which moves along its length. The rod is coupled to the head lift mechanism which loads and unloads the magnetic heads. The push rod is coupled to the pivot latch by means of a coil spring co-axially mounted on the push rod with the end of the spring furthest from the first end of the push rod fixedly attached to the push rod. The other end of the coil spring interacts with the pivot latch. The second end of the push rod is coupled to an actuator element of the head lift mechanism by means of a pivoted lever. During a head load cycle, the movement of the actuator element is coupled to the push rod to engage the latch before the heads are lowered onto the surfaces of the disc. A small button located at the tip of the first end of the push rod may be pressed through an opening in the disc-drive assembly to manually unload the heads from the surface of the disc and to disengage the pivot latch from the access door.

21 Claims, 2 Drawing Figures

ACCESS DOOR LATCH AND INTERLOCK MECHANISM

BACKGROUND OF THE INVENTION

1. Field of the Invention

The present invention relates to the field of interlock mechanisms for an access door through which a cartridge containing a magnetic disc is inserted into a disc-drive assembly. The interlock prevents the access door from being opened, and thus the cartridge from being removed, during the time that a magnetic head is loaded onto the disc or in the process of being loaded.

2. Prior Art

After a cartridge containing a magnetic disc has been inserted into a disc-drive assembly through an access door, one or more magnetic heads are loaded onto the disc to record or reproduce information. The inadvertent removal of the disc from the disc-drive assembly while the magnetic heads are loaded onto the disc could result in accidental damage to the heads or the head flexures on which the heads are mounted or in damage to the oxide or other coating used for information storage. It is therefore desirable to interlock the access door with the carriage mechanism which moves the magnetic heads radially with respect to the disc or with the mechanism used to load the heads upon the disc so that the cartridge may not be removed from the disc-drive assembly unless the heads are removed from the cartridge or unloaded from the disc. However, in the event of a power failure or a malfunction within the disc-drive assembly, it is desirable that there be some means for manually unloading the magnetic heads from the disc and disabling the interlock so that the disc may safely be removed and inserted into a functioning disc-drive assembly.

Most commonly, an electrical interlock employing a solenoid latch and a switch for sensing whether the heads are loaded onto the disc or not is used to prevent the inadvertent opening of the access door while the heads are in the loaded condition. The disadvantage of the solenoid and switch approach is the high cost associated with the use of the solenoid and the switch. A second disadvantage is that in the event of a power failure, the manual activation of the mechanism in order to unload the heads from the disc and to unlatch the door is very difficult and usually requires an additional mechanism.

A mechanical approach for preventing the removal of a cartridge containing a magnetic disc from a read and write apparatus while magnetic heads are within the cartridge has been described in U.S. Pat. No. 3,797,033 issued to Prieur. The apparatuses described in that patent employ pivoting brackets which hold the cartridge in position when the carriage on which the magnetic heads ride is displaced so that the heads are within the cartridge.

In the embodiment shown in FIGS. 1 and 2 of the Prieur patent, the cartridge is prevented from being removed from the disc-drive apparatus by either a lug or a rod which prevents the the holding brackets from pivoting when the magnetic heads are within the cartridge. The lug or rod is attached to one end of a cable or pull wire, the other end of which is attached to a lever coupled to the carriage so that the lug or rod is pulled out of interference with the holding bracket when the carriage is retracted to withdraw the heads from the cartridge. According to the patent, this permits the safe removal of the cartridge. As stated by the inventor (column 4, lines 13 through 21), neither of the devices shown in FIGS. 1 or 2 of the Prieur patent permit the holding bracket to be manually unlocked to enable the cartridge to be removed and used in another apparatus in the event of a breakdown or power failure.

In FIG. 3 of the Prieur patent, another embodiment is shown in which the cartridge may be removed from the apparatus in the event of a breakdown. However, as noted in the patent (column 4, lines 36 through 39), the bracket is not locked. However, damage to the disc is allegedly prevented since whenever the bracket is rotated, the carriage is simultaneously displaced to retract the heads from the cartridge.

SUMMARY OF THE INVENTION

An object of the present invention is to provide a mechanism which latches the disc-drive assembly access door through which a cartridge containing a magnetic disc has been inserted so that the access door cannot be inadvertently opened if a magnetic head is loaded upon the magnetic disc or in the process of being loaded. It is a further object of the present invention to provide, in such a mechanism, the capability for manually unloading the heads from the disc and unlatching the access door so that the cartridge may be safely removed in the event of a malfunction of the disc-drive apparatus or a power failure. Yet another object of the present invention is to provide a mechanism of high reliability and low cost having these capabilities.

The present invention achieves the above objects by providing, for a disc-drive assembly access door, a mechanical latch and interlock employing a push rod coupled to the head lift mechanism which loads and unloads the magnetic heads from the surfaces of the disc. In the present invention, as the head lift mechanism begins the cycle in which the heads are loaded onto the disc, the push rod engages the access door latch to prevent the head access door from thereafter being opened. The head load cycle then safely continues until the heads are completely loaded onto the disc. During this time, a spring is compressed by the push rod, increasing the force on the latch.

When the cartridge is to be removed from the disc-drive assembly, the head lift mechanism first unloads the heads from the disc before the access door is unlatched. During the unload cycle, as the heads are initially lifted from the disc, the force on the door latch is reduced. Only during the last part of the unload cycle, however, does the push rod pull the door latch from engagement with the door so that the door may be opened.

In the present invention, the magnetic heads may be manually unloaded from the disc and the access door unlatched in the event of a disc-drive malfunction or power failure by pressing upon the push rod through an opening in the disc-drive assembly. This procedure first unloads the heads from the disc and thereafter unlatches the access door so that the cartridge may be safely removed from the disc-drive assembly.

In the preferred embodiment of the invention to be described herein, a pivot latch having a flange attached to it through which a first end of the push rod moveably protrudes is used. The head lift mechanism is coupled to the push rod by means of a pivoted lever, one end of which is attached to a linearly moving actuator element of the head lift mechanism and the other end of which is attached to the second end of the push rod. Near the first end of the push rod, a coil spring is co-axially mounted on the push rod, with the end of the spring furthest from the first end of the push rod fixedly attached to the push rod. The other end of the co-axially mounted coil spring interacts with the pivot latch. On the tip of the first end of the push rod, a small button, larger than the opening in the flange through which the push rod protrudes, is fixedly attached to the push rod.

During the load cycle, the initial motion of the linearly moving actuator element of the head lift mechanism produces, through the coupling lever, a motion of the push rod along its length. This initial motion of the push rod presses the pivot latch against and under the door latch bar to hold the door in the latched, closed position. Further motion of the linearly moving actuator element of the head lift mechanism loads the heads upon the disc and moves the push rod further in the direction of the pivot latch, so that the co-axially mounted coil spring is compressed against the flange of the pivot latch to securely hold the pivot latch under the door latch bar. When the heads are to be unloaded, the compression of the spring is first relaxed as the push rod moves in the opposite direction. Thereafter, the pivot latch is rotated away from the door latch bar and the access door by the button affixed to the push rod pressing against the flange as the push rod continues to move. The access door may then be opened and the disc removed.

Manual operation is similar. A small opening in the disc-drive assembly permits the insertion of a rod-like means, such as a screw driver or a ballpoint pen, so that the button on the end of the push rod may be manually pressed in a direction generally along the line of the push rod. The motion of the push rod is coupled to the linearly moving actuator element of the head lift mechanism to first manually unload the heads from the surfaces of the disc. Thereafter, the motion of the push rod rotates the pivot latch out of engagement with the door latch bar, as has been described.

It will be particularly noticed that with the present invention, during the head load cycle, the access door is locked before the heads are loaded onto the surface of the disc, and during the head unload cycle, with both automatic and manual operation, the heads are first unloaded from the disc before the access door is unlocked. Thus, access to the cartridge is not possible with the use of the present invention while the heads are loaded onto the surface of the disc.

An additional feature of the present invention, in its preferred embodiment, is the novel means by which the coupling lever is coupled to the linearly moving actuator element of the head lift mechanism. The linearly moving actuator element of the head lift mechanism has an hourglass-shaped slot oriented generally transverse to the direction of motion of the actuator element through which one end of the coupling lever is inserted. The coupling lever is thus not physically attached to the actuator element but rides with it in the slot as the actuator element moves. This eliminates moments or side forces that normally result from the coupling of an end of a lever which pivots in an arc to an element which moves along a straight line.

The novel features which are believed to be characteristic of the present invention, both as to its organization and as to its method of operation, together with further objectives and advantages thereof, will be better understood from the following description, considered in connection with the accompanying drawings, in which a presently preferred embodiment of the invention is illustrated by way of example. It is expressly understood, however, that the description of the preferred embodiment and drawings are for the purpose of illustration and description only and are not intended as a definition of the limits of the invention.

DESCRIPTION OF THE PREFERRED EMBODIMENT

Figure 1:
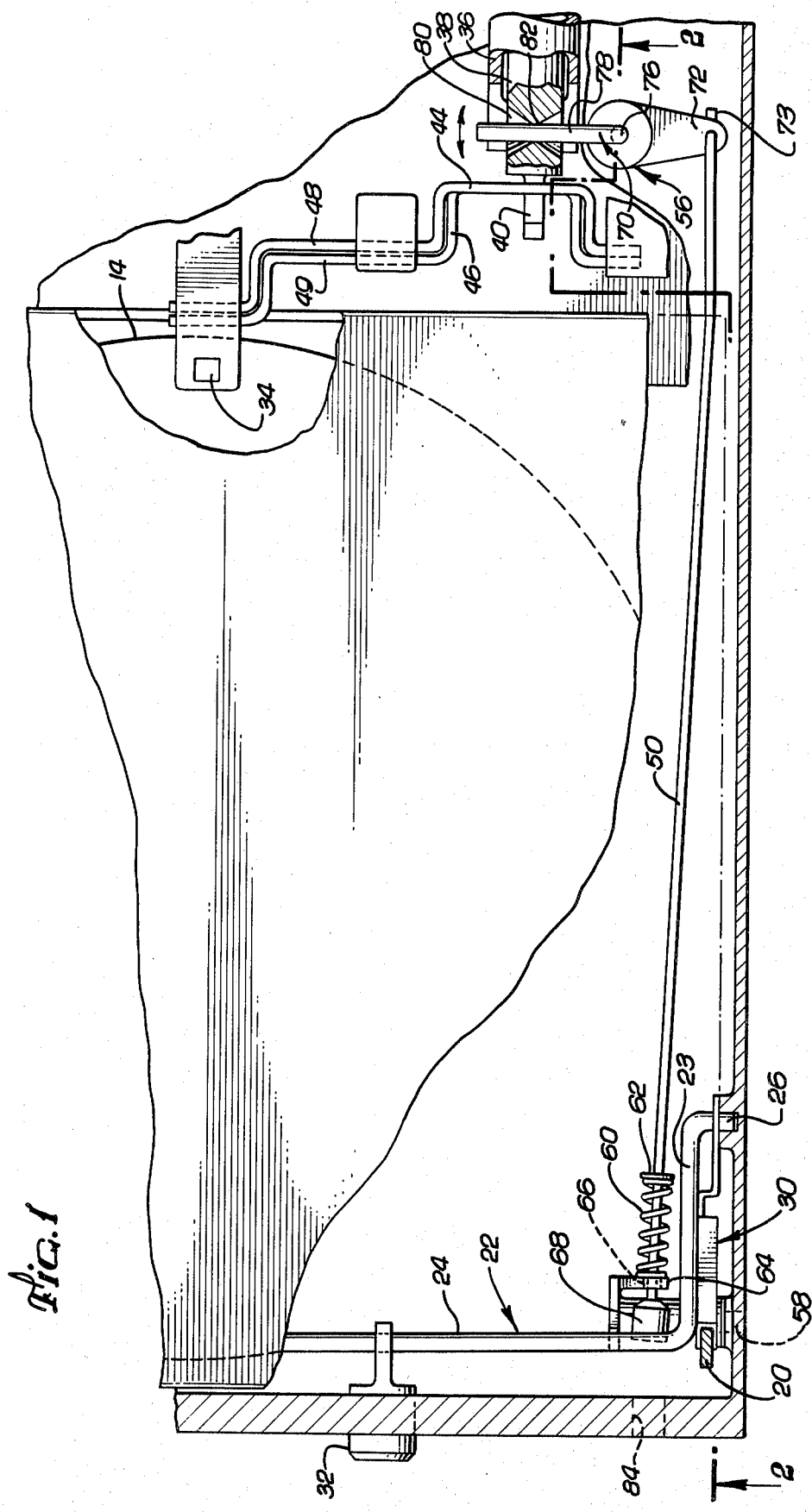
FIG. 1 is an overhead cutaway view of a portion of a disc-drive assembly in which the preferred embodiment of the present invention is employed. The present invention is shown during a head load cycle after the access door has been latched but before the magnetic heads have been loaded.
Figure 2:
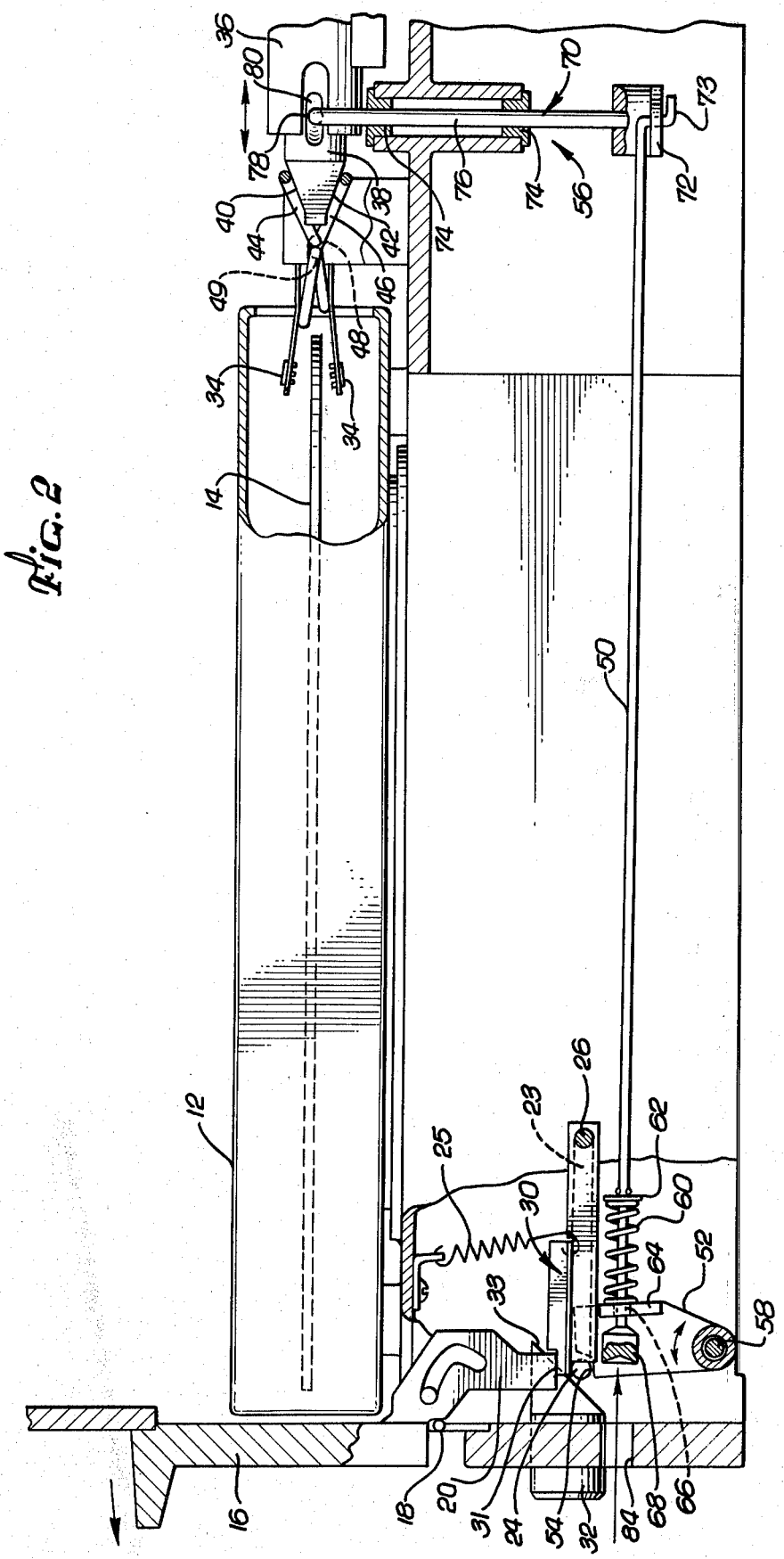
FIG. 2 is a sectional view of a portion of a disc-drive assembly taken along the lines 2—2 of FIG. 1 in which the preferred embodiment of the present invention shown in FIG. 1 is illustrated.

The preferred embodiment of the door access latch and interlock mechanism of the present invention is described with reference to a disc-drive assembly in which a cartridge 12 carrying a rotatable magnetic disc 14, as shown in FIGS. 1 and 2, may be inserted into the disc-drive assembly through an access door 16. Once the cartridge 12 has been inserted into the disc-drive assembly, magnetic heads 34 are used to read and/or reproduce information from the surfaces of the magnetic disc 14. The magnetic heads 34 are moved radially with respect to the disc by means of a carriage (not shown) and are loaded and unloaded from the surface of the disc 14 by means of a mechanical head lift mechanism 36.

The particular head lift mechanism 36 used with the preferred embodiment of the present invention described herein comprises a linearly moving actuator element 38 which displaces ramps 40 and 42 to lift or lower the heads 34 by means of lift rods 44 and 46 which pivot about axes 48 and 49 respectively. Thus, when the linearly moving actuator element 38 is moved to the right in FIGS. 1 and 2, the heads 34 are loaded onto the disc 14 as the lift rods 44 and 46 ride to the lower portion of the ramps 40 and 42. Alternatively, to unload the heads 34 from the disc 14, the linearly moving actuator element 38 is moved to the left in FIG. 2. The head lift mechanism described above is the subject of a patent application filed by the inventor herein and assigned to the same assignee as the present application. It will be appreciated, however, that the door access latch and interlock mechanism of the present invention is not limited to use with the particular head lift mechanism 36 used in conjunction with the preferred embodiment described herein.

The access door 16 pivots on door hinge 18 in order to open and allow the cartridge 12 to be inserted into the disc-drive assembly. When the disc-drive assembly is not in use and the cartridge 12 has not been inserted into it, the access door 16 is normally held and latched in the closed position by means of the engagement of the door arm 20 and the door latch bar 22.

The door arm 20 is a member fixedly attached to the access door 16. Door arm 20 extends into the disc-drive assembly in the area below that in which the cartridge 12 is placed. The door latch bar 22 is a rotating mechanism comprising a rod 24 oriented in the direction parallel to the door hinge 18. Rod 24 pivots about an axis 26 which is parallel to rod 24. A door latch block 30 is attached to the door latch bar 22 along the side member 23 of the door latch bar 22. Door latch block 30 is generally parallel to the side member 23 and has a notch 31 on its upper surface at the end closest to rod 24. The door latch bar 22 is spring-loaded by spring 25 attached between the side member 23 and an interior point within the disc-drive assembly so that the rod 24 and latch block 30 tend to rotate in a clockwise direction around axis 26 as viewed in FIG. 2. Since the door latch bar 22 is spring-loaded upward, the access door 16 cannot be opened because of the interference of the notch 31 of latch block 30 with the door arm 20. The pivot latch 52 shown in FIG. 2 is, while the disc-drive assembly is not in use, rotated clockwise from the position shown in that figure and does not engage the rod 24 of the door latch bar 22.

When it is desired to load a cartridge 12 into the disc-drive assembly, the access door 16 is opened by pressing push button 32. Push button 32 has, on its inside bottom side, a downward facing inclined portion 33 which cooperates with a portion of rod 24. When push button 32 is pressed, it forces rod 24 to ride downward on the inclined portion 33 of push button 32, thereby rotating rod 24 in a counterclockwise direction a small amount around axis 26. This causes the latch block 30 to no longer interfere with the door arm 20 at notch 31 so that the access door 16 may swing open on door hinge 18, permitting a cartridge 12 to be inserted into the disc-drive assembly.

The present invention prevents the access door 16 from being inadvertently opened when a cartridge 12 containing a magnetic disc 14 has been inserted into the disc-drive assembly and the magnetic heads 34 are loaded upon the disc 14 or in the process of being loaded onto the disc 14. To lock and unlock the access door 16, a push rod 50 moves along its length in order to rotate a pivot latch 52 into and out of engagement with the rod 24 of the door latch bar 22. FIG. 2 shows the pivot latch 52 in engagement with the door latch bar 22 and the access door 16. With the pivot latch 52 in this position, the notch 54 in pivot latch 52 prevents the rod 24 of the door latch bar 22 from being rotated in a counterclockwise direction with respect to axis 26. The access door 16, therefore, cannot be opened since latch block 30 attached to the door latch bar 22 is prevented from being rotated out of interference with the door arm 20.

The push rod 50 is a generally straight rod coupled at one end to the linearly moving actuator element 38 of the head lift mechanism 36 by means of lever 56. The pivot latch 52 is a small pivoted member rotating about an axis 58 which is generally parallel to the door hinge 18. Pivot latch 52 has a small notch 54 for engagement with the rod 24 of the door latch bar 22. Pivot latch 52 also has an integral flange 64 with a small aperture 66 through which the end of push rod 50 movably protrudes.

At the tip of push rod 50 a small terminating button 68 is fixedly attached to push rod 50. Terminating button 68 is larger than the opening 66 in flange 64 of the pivot latch 52, so that when push rod 50 moves sufficiently to the right in FIG. 2, terminating button 68 will press against flange 64 causing pivot latch 52 to rotate counterclockwise about axis 58.

On the side of flange 64 opposite to that on which terminating button 68 is located, a coil spring 60 is coaxially mounted about push rod 50 and retained at its end furthest from flange 64 by means of spring retainer 62 attached to push rod 50.

The other end of push rod 50 is attached to coupling lever 56. Coupling lever 56 is comprised of an L-shaped pivot rod 70 and a lever arm 72. The coupling lever 56 pivots in a bushing 74 mounted in the disc-drive assembly on the long side 76 of the L-shaped pivot rod 70. The short side 78 of the L-shaped pivot rod 70 is coupled to the linearly moving actuator element 38 of the head lift mechanism 36, as will be described, and forms one arm of the coupling lever 56. The lever arm 72 is fixedly attached to the long side 76 of the L-shaped pivot rod 70 and forms the second arm of the coupling lever 56. The lever arm 72 has, near its end, a small opening through which a bent portion 73 of the end of push rod 50 may be inserted to couple push rod 50 to coupling lever 56.

The preferred embodiment of the present invention employs a unique means of coupling the lever 56 to the linearly moving actuator element 38 of the head lift mechanism 36. An hourglass-shaped slot 80 is located in the linearly moving actuator element 38 and is oriented in a direction transverse to the direction of motion of actuator element 38. The smallest portion or waist 82 of slot 80 is sized to accommodate the short side 78 of the L-shaped pivot rod 70. The short side 78 of the L-shaped pivot rod 70 is not physically attached to the linearly moving actuator element 38 but rides within the slot 80 when the actuator element 38 is displaced. Thus the linear displacement of the actuator element 38 is transformed to an arcuate motion of the coupling lever 56 without the moments or side forces that would be created if the short side 78 of the L-shaped pivot rod 70 were physically attached to the linearly moving actuator element 38.

At the beginning of a head load cycle, the linearly moving actuator element 38 moves to the right in FIGS. 1 and 2 causing, through coupling lever 56, push rod 50 to move generally along its length in a direction toward the pivot latch 52. This rotates the pivot latch 52 into engagement with the door latch bar 22, thereby locking the access door 16. Continued motion of the actuator element 38 to the right loads the magnetic heads 34 on the disc 14. When the linearly moving actuator element 38 moves to the left to unload the head 34 from the magnetic disc 14, push rod 50 is pulled to the right in FIGS. 1 and 2. This causes the pivot latch 52 to rotate in a counterclockwise direction about its axis 58 out of engagement with the door latch bar 22, thereby unlocking the access door 16 and allowing the cartridge 12 to be removed as will be more particularly described.

The detailed operation of the access door latch and interlock mechanism of the preferred embodiment can be understood with reference to the above description. When a cartridge 12 containing a magnetic disc 14 is inserted through access door 16 into the disc-drive assembly, the magnetic heads 34 are in the unloaded position and the pivot rods 44 and 46 are riding on the highest parts of the ramps 40 and 42. The head lift mechanism is then actuated in order to begin the load cycle in which the magnetic heads 34 are lowered onto the disc 14. To accomplish this, the linearly moving actuator element 38 begins moving to the right in FIGS. 1 and 2, so that the pivot rods 44 and 46 ride on lower portions of the ramps 40 and 42, the magnetic heads 34 thereby being gradually lowered to the surface of the disc 14. This initial motion of the actuator element 38 rotates the short side 78 of the L-shaped pivot rod 70 clockwise as viewed in FIG. 2. The lever arm 72 of coupling lever 56 is also thereby rotated pushing the push rod 50 generally along its length to the left in the figures.

This longitudinal motion of push rod 50 is coupled to the pivot latch 52 by the compression spring 60, one end of which bears on the flange 64 of the pivot latch 52 to cause the pivot latch 52 to rotate on its axis 58 in a counterclockwise direction as viewed in FIG. 1. The notch 54 of the pivot latch 52 engages the rod 24 of the door latch bar 22 to prevent the access door 16 from being opened by the pressing of push-button 32 as has been previously described. FIG. 2 illustrates the mechanism of the present invention in this position, i.e., the linearly moving actuator element 38 has initiated the cycle for the loading of the magnetic heads 34 upon the disc 14 while the pivot latch 52 has been rotated to lock the access door 16. Thus, importantly, the access door 16 is locked before the load cycle has been completed to the point of actually loading the magnetic heads 34 onto the disc 14.

As the linearly moving actuator element 38 continues to lower the magnetic heads 34, push rod 50 is pushed further to the left in FIG. 2. Since pivot latch 52 has already rotated counterclockwise the full extent possible, compression spring 60 is compressed against flange 64 of the pivot latch 52 as the push rod 50 continues moving to the left. This increases the force on pivot latch 52, thus providing more assurance that access door 16 will not be inadvertently opened. The compression of coil spring 60 continues until the head load cycle is complete and the magnetic heads 34 have been loaded onto the magnetic disc 14.

When the cartridge 12 containing the magnetic disc 14 is to be removed from the disc-drive assembly, the head lift mechanism 36 is actuated to first remove the magnetic heads 34 from the surface of the disc 14. The linearly moving actuator element 38 is moved to the left in FIG. 2 causing, through pivoting lever 56, the push rod 50 to be pulled to the right. This initially relaxes the compression of coil spring 60 as the spring retainer 62 is moved further from the flange 64 of the pivot latch 52. The pivot latch 52, however, maintains its position in engagement with rod 24 of the door latch bar 22 so that the access door 16 remains locked. As the linearly moving actuator element 38 continues its motion to the left, the push rod 50 continues its motion to the right. This motion eventually causes the terminating button 68 to press against the flange 64 and to rotate the pivot latch 52 in a clockwise direction, as viewed in FIG. 2, about the axis 58. This disengages the pivot latch 52 from the rod 24 of the door latch bar 22. Push button 32 may then be depressed to force rod 24 downward and away so that door latch block 30 no longer interferes with the door arm 20, thus allowing the access door 16 to be opened and the cartridge to be safely removed.

The preferred embodiment of the present invention permits the safe removal of the cartridge 12 from the disc-drive assembly in the event of a power failure or disc-drive malfunction. In order to manually unload the magnetic heads 34 from the surface of the disc 14 and to disable the interlock, a small opening 84 is provided in the side of the disc-drive assembly opposite the terminating button 68 located on the end of the push rod 50. If, for example, a power failure occurs when the magnetic heads 34 are loaded onto the disc 14, a narrow rod-like object, such as a screwdriver or ballpoint pen, may be inserted into the opening 84 to press upon the end of the terminating button 68 which, for this reason, advantageously has a concave surface. Push rod 50 is displaced to the right in FIG. 2 causing, through coupling lever 56, the linearly moving actuator element 38 to move to the left, thereby lifting the magnetic heads 34 from the surface of the disc 14. As the terminating button 68 is depressed further by the rod-like object inserted into the opening 84, terminating button 68 bears against flange 64 of the pivot latch 52 and rotates it in a clockwise direction as viewed in FIG. 2. This allows push button 32 to be depressed in order to remove the door latch block 30 attached to the door latch bar 22 from interference with the door arm 20. Access door 16 may then be opened and the cartridge 12 safely removed and inserted into a functioning disc-drive assembly.

Thus, as the above description of the presently preferred embodiment shows, the present invention provides a door access latch and interlock mechanism in which the interlock is activated before the magnetic heads 34 are loaded onto the disc 14 during the load cycle and in which the magnetic heads 34 are first removed from the magnetic disc 14 before the interlock is disabled during the unload cycle. The present invention, therefore, provides a margin of safety to help insure that a cartridge 12 will not be inadvertently removed from a disc-drive assembly while the magnetic heads 34 are in the loaded condition or in the process of being loaded. Additionally, the preferred embodiment provides a manual means for unloading the magnetic heads 34 from the disc 14 and thereafter unlatching the access door 16 through the insertion of a readily available rod-like object, such as a ballpoint pen or a screw driver, into the opening 84. Cartridge 12 may thus be quickly and simply removed and inserted into a different disc-drive assemby if desired.

While the presently preferred embodiment has been described with respect to a specific configuration, variations are of course within the scope of the present invention. For example, in the preferred embodiment, the pivot latch 52 engages the access door 16 indirectly, i.e., through contact with rod 24 of the door latch bar 22. However, the present invention is equally applicable to access door mechanisms that do not use door latch bars, in which case the pivot latch 52 could directly bear against a portion of the access door. Such doors, for example, may be spring-loaded by means of a torsion spring so as to normally be closed. In such a case there would be no need for a door latch bar to hold the door closed or for a push button to disengage the door latch bar and the interlock mechanism could engage the access door directly.

As a second example, the present invention may be used with a sliding latch coupled to the end of the push rod, as well as the pivot latch described above.

As another variation, in some embodiments it may be desirable to use a straight coupling lever joining the end of the push rod with the head lift mechanism rather than the stepped coupling lever 56 of the presently preferred embodiment. In such a variation, the pivoting axis of the coupling lever may be tilted with respect to the axis of rotation of the disc.

In addition, for some disc-drive assemblies, the push rod may be coupled advantageously to the cartridge rather than to the head lift mechanism as described. The construction and operation of the latch and interlock mechanism would be similar to that described above.

Thus, it should be recognized that many modifications and variations not specifically discussed herein may readily occur to those skilled in the art. Consequently, it is intended that the claims be interpreted to cover such modifications and equivalents.

I claim:

1. A mechanism for use in a disc-drive assembly, said disc-drive assembly having an access door assembly, said access door assembly having an access door for insertion and removal therethrough of a cartridge containing a magnetic disc, said disc-drive assembly having a magnetic head within the disc-drive assembly for loading upon the magnetic disc, said mechanism for preventing the inadvertent opening of said access door and the removal of said cartridge containing a magnetic disc while a magnetic head is loaded upon the magnetic disc and for permitting said access door to be opened when no magnetic head is loaded upon the magnetic disc, said mechanism comprising:

a pivoted latch means pivotable into and out of engagement with said access door assembly for preventing said access door from being opened when said pivoted latch means is pivoted into engagement with said access door assembly and for permitting said access door to be opened when said pivoted latch means is pivoted out of engagement with said access door assembly;

a means for loading and unloading a magnetic head from the surface of a magnetic disc; and a mechanical linking means mechanically linking the pivoted latch means and the loading and unloading means for pivoting said pivoted latch means so that when said loading and unloading means begins to load said magnetic head onto said disc, said mechanical linking means causes said pivoted latch means to engage said access door assembly, thereby preventing said access door from being opened, and when said loading and unloading means unloads said head from said disc, said mechanical linking means causes said latch means to disengage from said access door assembly, thereby permitting said access door to be opened and said cartridge to be removed.

2. A mechanism as in claim 1 wherein said mechanical linking means comprises a rod located within said disc-drive assembly and movable along its length, said rod having a first end mechanically coupled to said pivoted latch means and a second end mechanically coupled to said loading and unloading means, whereby when said loading and unloading means begins to load said magnetic head onto said disc, said rod is moved in one direction along its length to pivot said pivoted latch means into engagement with said access door assembly, thereby preventing said access door from being opened, and when said loading and unloading means unloads said head from said disc, said rod is moved in the other direction along its length to pivot said pivoted latch means out of engagement with said access door assembly, thereby permitting said access door to be opened and said cartridge to be removed.

3. A mechanism as in claim 2 wherein said pivoted latch means has a notch which engages said access door assembly.

4. A mechanism as in claim 2 wherein:
said loading and unloading means comprises a linearly movable member, said member moving in one direction to load said head and in the opposite direction to unload said head; and wherein said mechanical linking means further comprises:

a pivoted lever having a first end on one side of its fulcrum coupled to said linearly movable member and having a second end on the other side of its fulcrum attached to the second end of said rod.

5. A mechanism as in claim 2 wherein:
said pivoted latch means has a flange having a small aperture through which the first end of said rod movably projects; and wherein said mechanical linking means further comprises:

a button larger than said aperture attached to the end of said rod; and a coil spring located coaxially with said rod near to said first end of said rod on the side of said flange opposite said button, said spring pressing against said flange of said pivoted latch means at one end of said spring and retained with respect to said rod at the other end of said spring by a spring retainer fixedly attached to said rod, said rod compressing said spring against said pivoted latch means in order to pivot said pivoted latch means into engagement with said access door assembly when said loading and unloading means is loading said head on said disc.

6. A mechanism as in claim 5 wherein:
said loading and unloading means comprises a linearly movable member, said member moving in one direction to load said head and in the opposite direction to unload said head; and wherein said mechanical linking means further comprises;

a pivoted lever having a first end on one side of its fulcrum coupled to said linearly movable member and having a second end on the other side of its fulcrum attached to the second end of said rod.

7. A mechanism as in claim 6 wherein said linearly movable member has a generally hourglass-shaped slot through it in the direction generally transverse to the direction of motion of said linearly movable member in which said first end of said pivoted lever is placed, whereby linear motion of said linearly movable member is coupled to rotation of the first end of said pivoted lever about its fulcrum.

8. A mechanism as in claim 4 wherein said linearly movable member has a generally hourglass-shaped slot through it in the direction generally transverse to the direction of motion of said linearly movable member in which said first end of said pivoted lever is placed, whereby linear motion of said linearly movable member is coupled to rotation of the first end of said pivoted lever about its fulcrum.

9. A mechanism as in claim 1 wherein said access door assembly includes an opening and closing device for said access door and said pivoted latch means is pivotable into engagement with said opening and closing device to prevent said access door from being opened and is pivotable out of engagement with said opening and closing device to permit said access door to be opened.

10. In a disc-drive assembly having an access door assembly, said access door assembly having an access door for insertion and removal therethrough of a cartridge containing a magnetic disc, said disc-drive assembly comprising at least one magnetic head for recording information on or reproducing information from the disc when the cartridge is inserted into the disc-drive assembly and a means for loading and unloading said head from said disc, an improved interlock for preventing the opening of the access door and the removal of the cartridge from the disc-drive assembly when a magnetic head is loaded onto the magnetic disc, said interlock comprising:

a pivoted latch pivotable into and out of engagement with said access door assembly;

a rod movable along its length cooperating with said means for loading and unloading said head from said disc, said rod movable in one direction when said means load said head and movable in the opposite direction when said means unloads said head, said rod mechanically coupled at a first end to said pivoted latch for pivoting said pivoted latch into engagement with said access door assembly when said head is loaded onto the disc to prevent the opening of the access door and the removal of the cartridge, and out of engagement with said access door assembly after said head has been unloaded from the disc to permit the opening of the access door and the removal of the cartridge.

11. An improved interlock as in claim 10 wherein said latch contains a notch engageable with said access door assembly to prevent said access door from being opened.

12. An improved interlock as in claim 10 or 11 wherein said rod is mechanically coupled near its first end to said latch by means of a spring located near said first end, said spring being retained with respect to said rod at one of its ends by a spring retainer fixedly attached to said rod and pressing against said latch at its other end, said rod compressing said spring against said latch in order to pivot said latch into engagement with said access door assembly when said loading and unloading means loads said head on said disc.

13. An improved interlock as in claim 12 wherein said spring is a coil spring located co-axially with said rod near the first end of said rod.

14. An improved interlock as in claim 13 wherein said disc-drive assembly has an opening near said first and of said rod and wherein:

said latch has a flange having a small aperture through which the first end of said rod movably projects, and said improved interlock further comprises:

a button larger than said aperture attached to the end of said rod, said button pressable when said head is loaded onto said disc and said latch is pivoted into engagement with said access door assembly through said opening in said disc-drive assembly from outside said disc-drive assembly to first move said rod along its length so that said rod cooperates with said loading and unloading means to unload said head from said disc, and to thereafter push said button against said latch at said aperture whereby said latch is pivoted out of engagement with said access door assembly.

15. An improved interlock as in claim 10 wherein said loading and unloading means has a linearly movable member which moves in one direction to load a magnetic head on the disc and in the opposite direction to unload a magnetic head from a disc and wherein said improved interlock further comprises:

a pivoted lever coupled on one side of its fulcrum to the second end of said rod and coupled on the other side of its fulcrum to said linearly movable member.

16. An improved interlock as in claim 14 wherein said loading and unloading means has a linearly movable member which moves in one direction to load a magnetic head on the disc and in the opposite direction to unload a magnetic head from a disc and wherein said improved interlock further comprises:

a pivoted lever coupled on one side of its fulcrum to the second end of said rod and coupled on the other side of its fulcrum to said linearly movable member.

17. An improved interlock as in claim 15 further comprising:

a generally hourglass-shaped slot in said linearly movable member generally transverse to the direction of motion of said member in which one end of said pivoted lever is placed, whereby linear motion of said linearly movable member produces rotation of said pivoted lever and movement of said rod along its length.

18. In a disc-drive assembly containing a magnetic head and a means for loading and unloading said head upon a magnetic disc disposed in a cartridge insertable into said disc-drive assembly, an improved access door and interlock assembly, said assembly for insertion and removal therethrough of said cartridge and for the prevention of the inadvertent removal of said cartridge from said disc-drive assembly when said head is loaded on said disc, said improved access door and interlock assembly comprising:

an outwardly opening access door on said disc-drive assembly through which said cartridge is insertable and removable therethrough, said access door having hinges along one side;

a flange attached to said access door on the inside of said access door near said hinges, said flange extending in said disc-drive assembly on the side of said hinges opposite to said access door;

a rigid latch bar attached to said disc-drive assembly rotatable about an axis parallel to said hinges, said rigid latch bar comprising a first portion offset from said axis and having a closing notch, said first offset portion engagable with said flange at said closing notch so that said access door cannot be opened when said first offset portion is engaged with said flange at said closing notch and said access door can be opened when said first offset portion is not engaged with said flange at said closing notch, said rigid latch bar also comprising a second portion offset from said axis, said second offset portion parallel to said axis;

means for biasing said rigid latch bar so that said rigid latch bar is rotated about said axis in a direction causing said first offset portion to engage said flange at said notch;

opening means operable from outside said disc-drive assembly for engaging said second offset portion and pressing said second offset portion so that said rigid latch bar rotates about said axis in a direction opposite to that which said bias means rotates said rigid latch bar so that said bias means is overcome when said opening means is operated and said first offset portion is disengaged from said flange at said closing notch, whereby said axis door can be opened;

an interlock latch having a locking notch, said interlock latch movable into and out of engagement with said second offset portion at said locking notch so that said rigid latch bar cannot be rotated about said axis and said opening means cannot be operated when said interlock latch is moved into engagement with said second offset portion; and control means coupled to said means for loading and unloading, said control means for moving said interlock latch so that said interlock latch is moved into engagement with said second offset portion when said head is loaded onto said disc and so that interlock latch is moved out of engagement with said second offset portion only when said head is not loaded on said disc.

19. An improved access door and interlock assembly as in claim 18 wherein said opening means comprises: a push button head having a surface within said disc-drive assembly inclined with respect to a plane perpendicular to the direction of movement of said push button, said surface being adjacent to said second offset portion so that said second portion is pressed by said inclined surface when said push button is pressed so that said pivoted latch bar is rotated in the direction opposite to that in which said bias means rotates said rigid latch bar.

20. An improved access door and interlock assembly as in claim 18 wherein said control means comprises: a rod movable along its length, said rod mechanically coupled at a first end to said interlock latch and mechanically coupled at a second end to said means for loading and unloading.

21. An improved access door and interlock assembly as in claim 20 wherein said interlock latch is a pivoted interlock latch rotatable into and out of engagement with said second offset portions.

* * * * *